Patented Aug. 5, 1924.

1,504,165

UNITED STATES PATENT OFFICE.

JOHN THOMAS, OF CARLISLE, ENGLAND, ASSIGNOR TO SCOTTISH DYES, LIMITED, OF CARLISLE, ENGLAND.

MANUFACTURE OF QUINIZARINE AND THE LIKE.

No Drawing. Application filed August 3, 1923. Serial No. 655,549.

*To all whom it may concern:*

Be it known that I, JOHN THOMAS, a subject of the King of Great Britain and Ireland, and residing at Murrell Hill Works, Carlisle, in the county of Cumberland, England, have invented certain new and useful Improvements in and Relating to the Manufacture of Quinizarine and the like, of which the following is a specification.

This invention relates to the manufacture of quinizarine and the like which may be used for example for the preparation of chlor-quinizarine and leuco-quinizarine.

The key to the invention is the chlorination of a hydroxy-anthraquinone containing one hydroxy group in the alpha position in strong sulphuric acid by free chlorine which yields a solution capable of direct hydrolysis, whereby 1-hydroxy-anthraquinone can be converted into 1:4-dihydroxy-anthraquinone (quinizarine) without isolation of intermediate products.

The invention will be mainly described with reference to a complete process for the production of quinizarine from 1-hydroxy-anthraquinone but examples of different steps or usages will be given.

In carrying the invention into effect in one form by way of example, 10 parts of anthraquinone-1-hydroxy are dissolved in 100 parts of sulphuric acid of about 98 per cent strength and 0.1 part of iodine added; chlorine is passed through this at 75° C. or higher until the requisite increase in weight has been obtained or more simply the reaction can be followed by taking the melting point of the samples withdrawn from time to time. The melting point first falls until generally about 150° to 155° C., but afterwards it begins to rise and when it is about 170 to 176° C. a chlorine determination may be carried out and if the chlorine is from 13.7 to 14 per cent the chlorination may be stopped, if it is desired to prepare only the mono-chlor derivative, namely, anthraquinone-1-hydroxy-4-chlor.

To the melt is then added 10 parts of boric acid and the whole is heated to 180° C. for eight hours. At the end of this time the hydrolysis is practically complete and if quinizarine is desired, the melt is blown into water and the hydroxy body isolated in the usual way. The yields are very good, slightly over 10 parts of quinizarine being obtainable.

If it is desired to obtain leuco-quinizarine, the sulphuric acid melt from the hydrolysis can be submitted to the action of aluminium powder and when reduction is complete, the leuco quinizarine isolated by pouring into water, filtering and drying at a low temperature.

If it is desired to obtain chlor-quinizarine, chlorination of the anthroquinone-1-hydroxy is continued until the melting point of a sample has risen to over 190° C., and the sample shows about 24 per cent chlorine. This is then submitted to hydrolysis after the addition of boric acid in the same way as for the production of quinizarine.

Instead of anthraquinone-1-hydroxy certain other hydroxy anthraquinones can be submitted to this process; for example, the dihydroxy anthraquinones, presumably 1:6 and 1:7 which are obtained from autoclaving with milk of lime of the residual sulphonic acids that are obtained in the production of alpha-sulphonic acid of anthraquinone by sulphonation in the presence of mercury and are also formed to some extent in the preparation of the alpha-alpha-disulphonic acids of anthraquinone.

The chlorination can be carried out in iron towers.

The chlorinations can be carried out at temperatures different from those given above, the best conditions being used for the particular body required.

The proportions of iodine used can also be varied.

The following specific examples illustrate modified processes according to the present invention:—

*Example 1.*

This example illustrates the production of 1-hydroxy-4-chlor-anthraquinone.

A jacketed stirrer pan is charged with 640 lbs. of concentrated or substantially non-aqueous sulphuric acid, that is, sulphuric acid of not less than about 94 per cent strength and into this is entered 120 lbs. of 1-hydroxy-anthraquinone. The temperature of the mixture is raised to 70–75° C. and kept at this temperature for a short time until the 1-hydroxy-anthraquinone has gone into solution. The charge is then circulated at 70–75° C. through a tower connected to the pan and dry chlorine passed through at the bottom of the tower at the rate of 5 to 6 lbs. per hour. After 80 lbs. of chlorine have been passed in, a sample of the charge is withdrawn and the crude 1-hydroxy-4-chlor precipitated by pouring into water, filtered and washed free from acid.

An estimation of the chlorine content is then made on the sample. This is usually about 13.7 per cent and the melting point is 181–184° C. If the chlorine content is low, a further 10 lbs. of chlorine is passed in and the charge again examined.

The melt is then blown into 600 gallons of water, boiled, further diluted, filtered, washed and dried. The yield of crude 1-hydroxy-4-chlor-anthraquinone approaches 90 per cent of the theoretical.

It is advisable not to carry out the operation at too high a temperature or at too great a concentration of acid in order to diminish the amount of sulphonation and loss of material which take place.

*Example 2.*

This illustrates the production of 1-hydroxy-2:4-dichlor-anthraquinone.

A pan is charged with 1-hydroxy-anthraquinone as described in Example 1, but instead of passing in 80 lbs. of chlorine, 150 lbs. are passed in, when a sample is withdrawn, and if the chlorine content is about 24 per cent the reaction may be considered practically complete.

If the chlorine content is low, further quantities of 10 lbs. of chlorine are passed in until the sample indicates that the dichlor compound has been formed. The progress of the reaction can also be followed by taking the melting point of the samples.

When the crude product isolated from a sample of the melts at 196–199° C., the reaction may be considered to be practically complete. The melt is then blown into 600 gallons of water, boiled, further diluted with cold water, filtered and washed free from acid.

*Example 3.*

This illustrates the production of 1:4-dihydroxy-2-chlor-anthraquinone.

A jacketed stirrer pan is charged with 600 lbs. of concentrated or substantially non-aqueous sulphuric acid, that is, sulphuric acid of not less than about 94 per cent strength, and 100 lbs. of 1:4-dihydroxy-anthraquinone. The charge is heated up to 70–75° C. and then circulated through a tower connected to the pan and chlorine passed in at the rate of about 3 lbs. per hour. After 60 lbs. of chlorine have been added, a sample is isolated and the chlorine content determined. This should be about 13 per cent. If the chlorine content is low a further 5 lbs. of chlorine are passed in and the product examined again. The course of the reaction can also be readily followed by taking the melting points of samples taken from the melt.

When the melting point is 208–211° C. the chlorine content is usually correct.

When chlorination is complete, the melt is blown into water, boiled, filtered and washed in the usual way.

The yields of chlor compounds are very good and approach the theoretical.

*Example 4.*

This is an alternative way of obtaining 1:4-dihydroxy-2-chlor-anthraquinone.

When the chlorination described in Example 2 is complete, instead of blowing the melt into water it is heated with 80 lbs. boric acid for twelve hours at 160° C. It is not advisable to carry this hydrolysis at higher temperatures owing to the considerable amount of destruction and sulphonation which is liable to take place.

When hydrolysis is complete the melt is then blown into water and the 2-chlor-dihydroxy-anthraquinone isolated in the usual way.

*Example 5.*

This illustrates the production of 1:4-dihydroxy-anthraquinone.

When chlorination is complete for the formation of 1-hydroxy-4-chlor-anthraquinone as described in Example 1, there is added to the melt 80 lbs. of boric acid.

The contents of the pan are then heated for twelve hours at 160° C. When hydrolysis is complete the melt is blown into water and the dihydroxy-anthraquinone isolated in the usual way, or the melt before being blown into water is cooled and reduced by the addition of aluminum powder. The melt is then blown into water and the leucoquinizarine isolated in the usual way. If the hydrochloric acid has not been expelled from the melt it is advisable to blow a current of air through it before proceeding with the reduction.

In the above chlorinations the addition of 0.1 per cent of iodine is found to have a beneficial effect.

Having now described my invention, what I claim as new and desire to secure by Letters Patent is:—

1. The process which consists in the chlorination by free chlorine in concentrated sulphuric acid of a hydroxy-anthraquinone containing a hydroxy group in the alpha position.

2. The process which consists in the chlorination by free chlorine in concentrated sulphuric acid of 1-hydroxy-anthraquinone.

3. The process which consists in the treatment in sulphuric acid of about 94 to 98 per cent strength at about 70° C. to 75° C., of a hydroxy-anthraquinone containing one hydroxy group in the alpha position with chlorine until the derivative contains at least 14 per cent of chlorine.

In testimony whereof I have signed my name to this specification.

JOHN THOMAS.